United States Patent
Jha et al.

(10) Patent No.: US 10,049,374 B2
(45) Date of Patent: Aug. 14, 2018

(54) COST IMPACT SIMULATOR AND GROSS PROFIT ANALYZER

(71) Applicant: Oracle International Corporation, Redwood Shores, CA (US)

(72) Inventors: Anup Kumar Jha, Foster City, CA (US); Ashish Pathak, San Ramon, CA (US); Fan Yang, Foster City, CA (US); Ivan Canales Pineda, Menlo Park, CA (US); Rixin Zhu, Fremont, CA (US); Bryan Siu Him So, Hayward, CA (US); Ramchand Raman, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 411 days.

(21) Appl. No.: 14/335,704

(22) Filed: Jul. 18, 2014

(65) Prior Publication Data

US 2016/0019563 A1 Jan. 21, 2016

(51) Int. Cl.
  *G06Q 30/02* (2012.01)
  *G06Q 10/08* (2012.01)

(52) U.S. Cl.
  CPC ....... *G06Q 30/0202* (2013.01); *G06Q 10/087* (2013.01)

(58) Field of Classification Search
  CPC .................. G06Q 30/0202; G06Q 10/087
  USPC ........................................... 705/7.31
  See application file for complete search history.

(56) References Cited

U.S. PATENT DOCUMENTS

| | | |
|---|---|---|
| 4,847,761 A | 7/1989 | Ferriter et al. |
| 4,862,376 A | 8/1989 | Ferriter et al. |
| 6,493,679 B1 | 12/2002 | Rappaport et al. |
| 7,092,929 B1 | 8/2006 | Dvorak et al. |
| 7,251,615 B2 | 7/2007 | Woo |
| 8,380,588 B2 | 2/2013 | Batra et al. |
| 8,386,296 B2 | 2/2013 | Hage et al. |
| 8,484,069 B2 | 7/2013 | Kisin et al. |

(Continued)

FOREIGN PATENT DOCUMENTS

WO 2002077917 A1 10/2000

OTHER PUBLICATIONS

Acorn, "Cost-to-Serve: Cost & Profitability Analysis", No Date, Retrieved from http://www.acornsys.com/Portals/76901/docs/sb.cost-to-serve.pdf, 6 pages.

(Continued)

*Primary Examiner* — Jeffrey P Zimmerman
*Assistant Examiner* — Shelby A Turner
(74) *Attorney, Agent, or Firm* — Kilpatrick Townsend & Stockton LLP

(57) ABSTRACT

Changes in the supply chain of one product may affect the price and availability of many other products. Likewise, a product may be composed of a number of smaller parts. Changes in the cost or availability of any of the parts that comprise a product may result in changes in cost or availability of the product as well as many other related products. A supply chain analysis engine is used to model a supply chain. The supply chain analysis engine may identify dependencies between products, sub products, and supply chains. The dependencies may be used to analyze the impact of a change in the supply chain on all relevant products.

14 Claims, 13 Drawing Sheets

(56) References Cited

U.S. PATENT DOCUMENTS

| | | | | |
|---|---|---|---|---|
| 2002/0156663 | A1* | 10/2002 | Weber | G06Q 10/04 |
| | | | | 705/7.26 |
| 2002/0178109 | A1 | 11/2002 | Bye et al. | |
| 2003/0014287 | A1 | 1/2003 | Williams et al. | |
| 2006/0116927 | A1 | 6/2006 | Miller, III et al. | |
| 2008/0221960 | A1* | 9/2008 | Moorkanat | G06Q 10/04 |
| | | | | 705/7.25 |
| 2010/0125486 | A1* | 5/2010 | Sinclair | G06Q 10/08 |
| | | | | 705/7.31 |
| 2014/0046585 | A1* | 2/2014 | Morris, IV | G01C 21/00 |
| | | | | 701/468 |
| 2014/0278728 | A1* | 9/2014 | Hollenbach | G06Q 10/0635 |
| | | | | 705/7.28 |
| 2014/0337083 | A1* | 11/2014 | Goyal | G06Q 10/06393 |
| | | | | 705/7.25 |
| 2016/0019662 | A1 | 1/2016 | Pineda et al. | |

OTHER PUBLICATIONS

Author Unknown, "Cost Simulations: Oracle In-Memory Cost Management User's Guide", Release 12.1, Copyright 2013, Retrieved from http://docs.oracle.com/cd/E18727_01/doc.121/e40699/T616460T616616.htm on Feb. 11, 2014, 13 pages.

Author Unknown, "Profit Analysis: Oracle In-Memory Cost Management User's Guide", Release 12.1, Copyright 2013, Retrieved from http://docs.oracle.com/cd/E18727_01/doc.121/e40699/T616460T616595.htm on Feb. 12, 2014, 12 pages.

Irvin, K., "Gross Profit Analyzer Overview", Copyright 2010-2013, Retrieved from http://www.q2q.us/GPAoverview.htm, 1 page.

Lang, K. "Epicor Introduces Customer Profit Analyzer Application", May 8, 2012, Retrieved from http://www.marketwired.com/press-release/epicor-introduces-customer-profit-analyzer-application-1654397.htm, 4 pages.

Lawson, "Lawson Opportunity Analyzer". No date, Retrieved from http://www.intentia.fi/www/resource.nsf/pub/Lawson_OA_step-by-step_LowRes.pdf/$FILE/Lawson_OA_step-by-step_LowRes.pdf, 4 pages.

Oracle, "Oracle E-Business Suite: Oracle In-Memory Cost Management on the Oracle SuperCluster M6-32", Oracle White Paper, Sep. 2013, Retrieved from httP;//www.oracle.com/us/products/servers-storage/servers/sparc/supercluster/in-mem-cost-mgmt-osc-m6-32-wp-2017908.pdf, 18 pages.

Relay Health, "Prescription Sales Analyzer", Copyright 2013, Retrieved from http://www.relayhealth.com/solutions/pharmacy-solutions/Prescription-Sales-Analyzer.html, 1 page.

Sage Software, Inc., "Sage ERP X3: Manufacturing", Copyright 2010, Retrieved from http://na.sage.com/us/erp/sage-erp-x3/~/media/site/sage-erp-x3/responsive/resources/sage-erp-x3-manufacturing.pdf, 2 pages.

Bill of Materials (BOM) Management, Arena Solutions, retrieved from: http://www.arenasoiutions.com/products/bomcontrol/features/all-features, 2014, 21 pages.

Bill of Materials (BOM) Software Systems, MasterControl, Retrieved from http://www.mastercontrol.com/bom, Copyright 2000-2014, 3 pages.

Bill of Materials and Supplier Plan, PD-Trak Solutions, Retrieved from http://www.pd-trak.com/billofmaterials.htm, 2010, 3 pages.

Oracle In-Memory Cost Management User's Guide: Cost Comparisons, Release 12.1, https://docs.oracle.com/cd/E18727_01/doc.121/e40699/T61649.htm, 2013, 6 pages.

Work Breakdown Structure, ZainBooks.com, retrieved from http://www.zainbooks.com/books/management/projectmanagement_22_work-breakdown-structure.html, 6 pages.

U.S. Appl. No. 14/335,387, Non-Final Office Action dated Nov. 17, 2016, 15 pages.

* cited by examiner

| Entity | Entity Type | Current Unit Cost |
|---|---|---|
| B | Item | 3 |
| E | Item | 4 |
| F | Item | 6 |
| G | Item | 2 |
| I | Item | 5 |
| J | Item | 9 |
| L | Item | 11 |
| N | Item | 7 |
| P | Item | 8 |
| Res1 | Resource | 2.5 |
| Res2 | Resource | 1.5 |
| Res3 | Resource | 2 |
| Ovh1 | Overhead | 0.2 |
| Ovh2 | Overhead | 0.3 |
| Ovh3 | Overhead | 0.5 |
| Ovh4 | Overhead | 0.4 |

FIG. 8A

| Assembly/Subassembly | Current Unit Cost |
|---|---|
| A | 107.5 |
| C | 50.8 |
| D | 12 |
| H | 24.5 |
| K | 68.4 |
| M | 31 |

FIG. 8B

| Entity | Entity Type | Simulated Unit Cost |
|---|---|---|
| B | Item | 2 |
| Res2 | Resource | 1.2 |
| Ovh4 | Overhead | 0.5 |

FIG. 8C

| Entity | Entity Type | Impacted |
|---|---|---|
| B | Item | A |
| B | Item | C |
| Res2 | Resource | A |
| Res2 | Resource | C |
| Ovh4 | Overhead | K |

FIG. 8D

| Entity | Current Unit Cost | Simulated Unit Cost |
|---|---|---|
| A | 107.5 | 100.7 |
| C | 50.8 | 47.9 |
| K | 68.4 | 68.5 |

FIG. 8E

| Order Number | Date | Product | Quantity | Invoiced Amount | COGS | Margin | Sim. COGS | Sim. Margin |
|---|---|---|---|---|---|---|---|---|
| 1 | Jan, 2, 2014 | A | 2 | 240 | 215 | 25 | 201.4 | 38.6 |
| 2 | Jan, 5, 2014 | C | 10 | 599 | 508 | 91 | 479 | 120 |
| 3 | Feb, 25, 2014 | K | 3 | 225 | 205.2 | 19.8 | 205.5 | 19.5 |

FIG. 8F

COST IMPACT SIMULATOR AND GROSS PROFIT ANALYZER

BACKGROUND

Modern manufacturing often leads to complicated items being manufactured across multiple sites, frequently in geographically-separated locations and possibly scattered across multiple countries. To complicate matters, a product may be a subassembly of other products. Changes in the supply chain of one product may affect the price and availability of many other products.

Such complications may make it difficult to determine the effects of a change in aspects of a supply chain.

SUMMARY

In some embodiments, a method for supply chain analysis includes steps for receiving data for a first supply chain for a first product. An indication of a predicted change to the supply chain may also be received and a first impact may be determined. The first impact may quantify the impact to the first product due to the predicted change in the first supply chain. If the first impact is greater than a threshold a first supply chain scenario may be generated. The supply chain scenario may be a modification of the first supply chain. A second impact may be determined, the second impact may quantify the impact to the first product due to the predicted change if the product is manufactured according to the first supply chain scenario. The method may also determine if the second impact is greater than the threshold.

In embodiments the method may include receiving data for a second supply chain for a second product and determining a third impact. The third impact may quantify the impact to the second product due to the predicted change in the second supply chain. If the third impact is less than the first impact the method may identify elements of the second supply chain that are different from the first supply chain and generate a second supply chain scenario. The second scenario may be a modification of the first supply chain according to the identified differences. The method may further include determining a fourth impact. The fourth impact may quantify the impact to the first product due to the predicted change in the second supply chain scenario. In embodiments the first impact and the second impact may be a cost of the product. The first impact and the second impact may be the availability of the product or the profitability of the product.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 8A-8F illustrate example data tables used during supply chain analysis.

DETAILED DESCRIPTION

Figure 1:
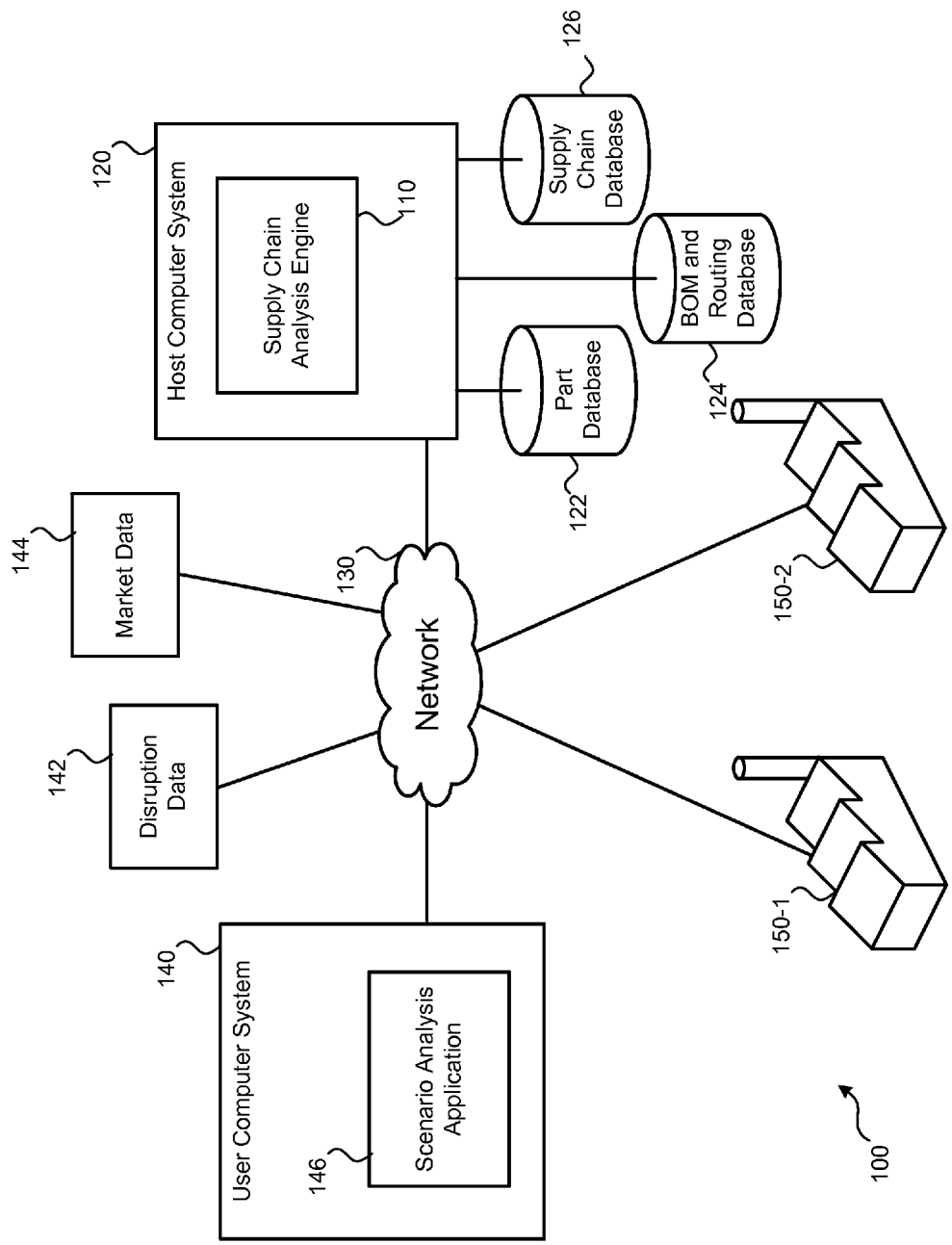
FIG. 1 illustrates an embodiment of a system configured to perform a supply chain analysis.

Products and services may have complex supply chains. A supply chain may include numerous transactions and factors that may affect the cost and/or availability of a product. Inventory levels, material costs, personnel availability, manufacturing complexity, and a vast number of other factors may affect the cost and availability of a product.

In many cases, during manufacture or distribution of a product, there may be changes or factors that may affect the supply chain. Changes may affect the cost and/or the availability of a product. In many cases, even small changes in the supply chain may affect the cost and/or availability of a product and may affect the profitability of a product.

A product may be a subassembly of other products. Changes in the supply chain of one product may affect the price and availability of many other products. Likewise, a product may be composed of a number of smaller parts. Changes in the cost or availability of any of the parts that comprise a product may result in changes in cost or availability of the product as well as many other related products.

Current manual methods may take weeks of effort and a team of experts with comprehensive business knowledge to perform supply chain analysis. A long and complicated analysis process may make it impossible to effectively react to changes in the supply chain. In many cases, effective supply chain management may require proactive analysis. Proactive analysis of a variety of possible supply chain scenarios may be useful identify contingency plans in case of unexpected changes to the supply chain. Manual methods that require weeks for analysis may not be practical in dynamic environments or markets where changes may occur frequently.

In embodiments, a supply chain analysis engine may be used to model a supply chain. The supply chain analysis engine may be used to determine the effects of changes in the supply chain. The supply chain analysis engine may identify dependencies between products, sub products, and supply chains. The dependencies may be used to analyze the impact of a change in the supply chain on all relevant products. The analysis engine may allow a user to submit changes to a supply chain. The analysis tool may identify the products or services that may be affected by the changes as well as any impact of the changes in the supply chain on the cost or availability of the product. In embodiments, the analysis engine may allow a user to manipulate supply chain parameters to develop supply chain scenarios. The scenarios may be analyzed to determine the impacts of the scenarios on the cost or availability of a product. In some cases, supply chain analysis engine may identify likely supply chain changes and automatically generate supply chain scenario predictions.

In embodiments, a supply chain analysis engine may be used to diagnose or identify a source of a cost increase of a product. The analysis engine may monitor the cost of a product or the availability of a product. When the cost or availability changes the engine may analyze the supply chain associated with the product and the supply chains of any sub products or related items to identify possible causes. The engine may compare historical supply chain data to the most current supply chain data to identify possible causes.

In embodiments a supply chain analysis engine may monitor supplier activity, material costs, costs of sub-assemblies, and the like to identify possible fluctuations or changes that may affect the cost or availability of a product. The engine may be configured to generate an alert when the changes are determined to have an effect on a product or parts of the supply chain.

In some embodiments, the engine may identify or monitor trends in the supply chain. If specific parts of the supply chain are observed to have increasing prices over a time interval the trends may be extrapolated to predict a likely price in future. The extrapolated values may be simulated to determine the effect on price or availability of a product associated with the supply chain. For example, the simulation tool may monitor the price of raw materials and ingredients that are used in a product. Changes in the price of the raw materials may be monitored to determine a trend. When the trend indicates a steady increase in price in past periods, the engine may extrapolate the likely price of the raw materials and ingredients in the future. The engine may determine how the projected price of the raw materials may affect the cost or availability of a product. The analysis engine may determine possible supply chain scenarios resulting from the predicted trends and analyze the supply chain scenarios to determine impacts on a product.

In embodiments, a supply chain analysis engine may be used to simulate changes in a supply chain. The analysis engine may be configured to simulate supply chain scenarios and determine the impact of the scenarios on the cost or availability of a product. Various scenarios may be evaluated to determine which changes or disruptions are potentially the most impactful to a product. For example, scenarios may be used to determine the maximum duration of a supply chain disruption that does not result in a price increase of a product. Supply chain scenarios may be generated with various durations of disruptions to the supply chain. For each scenario the impact on the price of a product may be determined. The scenarios that do not result in a price change of product may be flagged and the scenario with the longest disruption identified to determine the longest disruption.

In some embodiments, the analysis engine may be configured to identify weak points in the supply chain. Weak points in the supply chain may include items, services, materials, machines, factories, and the like that, when disrupted, may result in a large delay in availability of a product or large increase in the cost of a product. The weak points, once identified, may be mitigated by adding contingency plans. In embodiments the analysis engine may simulate or evaluate the impact of a range of supply chain scenarios. The scenarios may be configured to modify or evaluate specific areas of the supply chain. The scenarios may be evaluated to determine which scenarios may have the largest impact on a product.

In some cases the analysis engine may receive or identify the likelihood of specific disruptions or changes in the supply chain. Weather information, price analytics, and the like may be received and used by the analysis engine. The analysis engine may simulate the various disruptions and changes to determine their impact on the product price, delivery time, and/or other factors. The analysis engine may weigh the likelihood of some disruptions with the effects of the disruptions (e.g. magnitude of price increase of product) to determine the likely and impactful scenarios.

A supply chain may be modified to avoid weak areas. In some cases the analysis engine may automatically or based on user input simulate potential mitigation scenarios to reduce the impact of the disruptions in the supply chain identified to have the largest impact on a product. For example, if disruptions to supplier of a supply chain are identified to cause unacceptably large delays in product availability additional suppliers may be added to the supply chain.

In some embodiments, the analysis engine may be configured to identify strong points in the supply chain. Strong points in the supply chain may include items, services, materials, machines, factories, and the like that, when disrupted, may cause minimal or no impact on a product. Strong points in a supply chain may result in unnecessary cost and may in some cases substituted with other items or services that may reduce the costs of products. In embodiments the analysis engine may simulate or evaluate the impact of a range of supply chain scenarios. The scenarios may be configured to modify or evaluate specific areas of the supply chain. The scenarios may be evaluated to determine which scenarios may have the smallest impact on a product. Additional supply chain scenarios may be identified that substitute the identified strong areas with alternative items or services to determine if they may result in a reduction in the costs of any products.

A supply chain analysis engine may be configured to monitor and analyze the gross profits and profit margin of a product. The supply chain engine may monitor the cost of the product and calculate changes in the gross profits and profit margins as changes in the supply chain of products are identified. The gross profits and profit margins may be calculated using the retail sale of a product and the cost of the product. The analysis engine may monitor the demand of the products and the inventory of products to identify if the retail price is viable. The analysis engine will allow simulation of changes to product price. Simulation output will provide update to the existing gross profits and profit margins to allow determinations of best price scenario, price planning, future price lists and, sales promotion planning.

It is to be understood that a product, as described herein, may include physical products, virtual products, services, software, and the like. Supply chains may include physical resources, materials, labor, transportation, warehouse and other factors for each product. For example, in the case of physical products such as machines or devices, the supply chain may include manufacturing plants, distribution channels, labor, raw material suppliers, and the like. In another example, in the case of services such as consulting services, supply chain may include consultants, travel infrastructure, hotels, and the like. In yet another example, in the case of software products a supply chain may include servers, networks, programmers, and the like. Those skilled in the art will appreciate that there may be various forms of products and respective supply chains. Although the descriptions herein use examples describing physical products, it should be appreciated that the methods and systems described herein are not limited to specific products or supply chains.

FIG. 1 illustrates an embodiment of a system 100 configured to perform supply chain analysis. System 100 may include: supply chain analysis engine 110, which may be hosted by host computer system 120, product and part databases 122, supply chain databases 126, network 130, user computer system 140, which may execute a scenario analysis application 146, and manufacturing facilities 150. The system 100 may also include disruption data 142 and market data 144 sources. The data sources 142, 144 may provide historical data or predictions regarding likely disruptions, supply changes, changes in prices of raw materials and the like. It should be understood that system 100 represents a simplification of various embodiments of systems that can perform supply chain simulation.

Host computer system 120 may serve to host the supply chain analysis engine 110. Host computer system 120 may be a single computer server, multiple computer servers functioning in tandem, or a distributed computing system. Host computer system 120 may be configured to respond to requests from multiple user computer systems scattered geographically, such as around the world. In some embodiments, host computer system 120 is operated by a cloud computing service provider and provides the supply chain analysis engine 110 as a service to multiple, unrelated entities. FIG. 1 illustrates system 100 being operated on behalf of a single entity. In some embodiments, host computer system 120 is operated by the same entity operating (or analyzing) manufacturing facilities 150. Further detail regarding the functionality of supply chain analysis engine 110 is provided in relation to supply chain analysis engine 200 of FIG. 2.

Part databases 122, are databases that maintain information about parts used in the manufacture of various products. Part databases 122 may store information about the costs associated with particular parts. Part databases may include information about components, materials, labor, or other resources that may be related to producing a part. Parts databases may information about the products the parts are utilized in. Entries in part databases 122 may be organized by part number. For each part, information may be maintained that is indicative of the cost of the part. The cost of the part may be inclusive of multiple sub-costs, such as the cost to transport a part to a particular manufacturing facility, the taxes associated with a product when imported to a particular manufacturing facility, the cost to install the part in an item, the price at which the part is obtained from a supplier, the price of raw materials to build the part, the cost associated with the amount of time machinery is used to process/create/modify the part, etc. Such costs may be combined into an overall cost for the part or may be broken out into individual costs associated with the use of the part. In some cases the part databases 122 may include relation databases or other hierarchical structures that capture and organize the relationship between various parts and elements of a part.

Supply chain databases 126, may maintain information about parts, methods, factories, resources, labor, and the like that are used in the manufacture of various products. The supply chain databases may include transaction details of the various steps performed in the supply chain, sales order capture and executions, purchase order capture and execution, manufacturing order capture and execution, receiving materials from suppliers, moving material within warehouse and shipping products to customers The supply chain databases may include timing assumptions or requirements for each step of manufacturing. Entries in supply chain databases 126 may be organized by product. For each product, information may be maintained that is indicative of all the methods, and resources that are used to manufacture the product. In some cases the supply chain databases 126 may comprise data structures such as linked lists, or ordered structures that capture and organize the relationship between various resources required for each product and the timing constraints associated with the steps of manufacture.

BOM and routing database 124 may store information on various products. In some embodiments, BOM and routing database 124 is combined with one or more of part databases 122. The BOM and routing database may include information about parts used and routing process followed in the production of product. The BOM and routing database may include information about substitute parts that may be available. The BOM may include a list of products each part or product is associated with, the quantity, how critical or unique the part is for each product, and the like.

Each manufacturing location 150-1, 150-2 may provide data regarding its capacity, products, manufacturing order, part movements, resources, inventory levels, delays, and other status information. Manufacturing facilities may be in communication with supply chain analysis engine. Manufacturing facilities may report up-to-date status, delays, capacity, and costs associated with manufacturing facilities. Manufacturing locations may provide forecast information about possible disruptions, delays, or manufacturing problems. Data of each manufacturing location may be provided by a user or manager of each location. In some cases manufacturing location data may be automatically determined by product or part status information. During manufacturing of a part each manufacturing location may provide real time data as to the location of the part, or the completion status of each part. The data may be analyzed by the analysis engine to determine is the production of a part is progressing according to an expected schedule.

Disruption data 142 may provide data to the analysis engine related to existing and possible future disruptions in the supply chain. The disruption data may include likelihood of each disruption. In some cases the disruption data may be filtered or configured to only report disruptions that have likelihood of greater than 5%. In some embodiments the analysis engine may have a user configurable setting or filter for receiving data for disruptions that have a specific likelihood of occurrence.

The disruption data may include weather information, political unrest, labor strikes, supply shortages, and the like. For example, weather forecast information for locations of factories or supply and delivery routes associated with a supply chain may be monitored. Storms that may shut down factories or cause damage to delivery routes may be identified. The likelihood of the weather event and the likelihood of a disruption resulting from the weather event may be used by the analysis engine to determine potential impact to a product. In another example, potential labor strikes may be monitored for areas associated with the supply chain. Labor tensions or strike announcements may be monitored to identify possible disruptions to the supply chain.

Disruption data may be received directly from individual data providers such as weather forecasters, news networks, trade unions, or other sources. In some embodiments, service providers may analyze and summarize data and provide distilled data relevant to the supply chains.

Market data 144 may provide data to the analysis engine related to market prices of raw material, parts, transportation, and labor. Market data may, for example, include the cost of raw materials. The market data may include trends in market prices or demand. In many cases there may be a delay between a rise in market price of a raw material and a rise in price of parts of goods associated with the raw material. The delay in price propagation may allow the analysis engine to proactively propose and/or make changes or adjustment to its supply chain when rising raw material costs are observed before the costs of parts increases. Market data may be received directly from commodity markets, government unemployment data, and the like.

Network 130 represents one or more public and/or private networks that allow for communication between user computer system 140, host computer system 120, and manufacturing facilities 150. In some embodiments, part databases 122 and/or BOM database 124 is accessible via network 130. A public network may be the Internet. A private network may be a corporate intranet.

User computer system 140 may represent a computing device of a user. User computer system 140 may be a desktop computer, a laptop computer, a tablet computer, a smartphone, a head-mounted display (HMD) computer system, or any other form of computerized system that allows for a user to communicate with network 130. User computer system 140 may allow a user to interact with host computer system 120 via network 130. User computer system 140 may permit a user to submit requests for simulation of impact or effects of supply chain changes. User computer system 140 may permit user to view or analyze supply chain data and supply chain simulation results.

User computer system 140 may execute a scenario analysis application 146 which can communicate with supply chain analysis engine 110 via network 130. The scenario analysis application 146 may be configured to configure the supply chain analysis engine, the application 146 may allow the user to receive and interpret simulation results.

Figure 2:
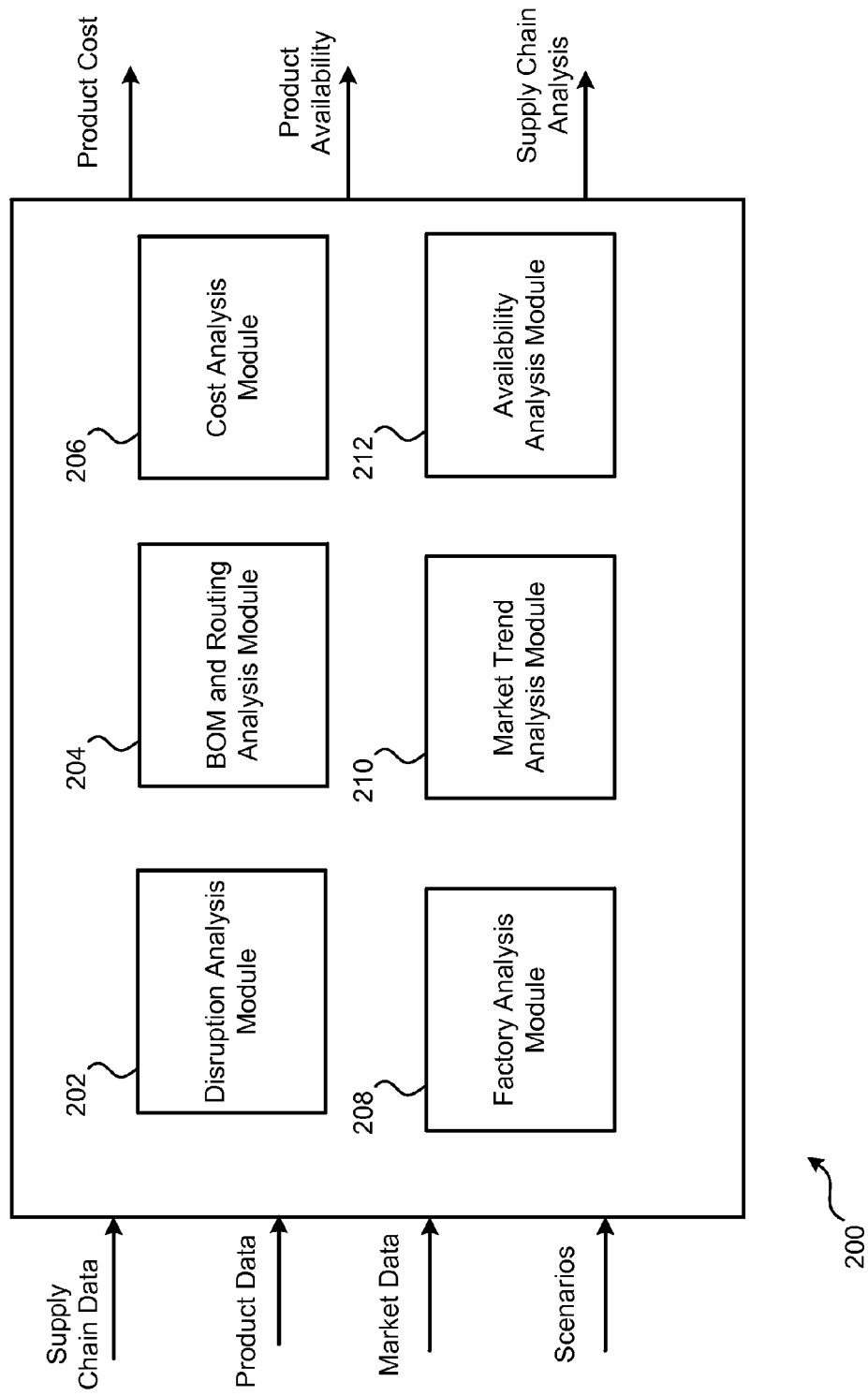
FIG. 2 illustrates an embodiment of a supply chain analysis engine.

FIG. 2 illustrates an embodiment of a supply chain analysis engine 200. Supply chain analysis engine 200 represents an embodiment of supply chain analysis engine 110 of FIG. 1. Supply chain analysis engine 200 is illustrated as being composed of multiple components. It should be understood that supply chain analysis engine 200 may be broken into a greater number of components or collapsed into fewer components. Each component of the supply chain analysis engine 200 may include computerized hardware, software, and/or firmware. In some embodiments, supply chain analysis engine 200 is implemented as software that is executed by host computer system 120 of FIG. 1. Supply chain analysis engine 200 may include a disruption analysis module 202, a BOM and routing analysis module 204, a cost analysis module 206, a factory analysis module 208, a market trend analysis module 210, and an availability analysis module 212.

The supply chain analysis engine 200 may receive data related to the supply chain of one or more products and determine or simulate the effects of changes on the supply chain. The engine 200 may determine effects on cost, price and availability of a product. The supply chain analysis engine 200 may recommend future date for the system to cutover to the new cost structure.

The supply chain analysis engine 200 may have as input supply chain data, product data, market data, and/or specific supply chain scenarios. The inputs may originate from local databases such as the BOM and routing database 124, part database 122, or supply chain database 126 from FIG. 1. The inputs may originate from sources such as market data 144, disruption data 142, or data from factories 150 that may be received from the network 130. In some cases data, such as supply chain scenarios, may originate from a scenario analysis application 146 from a user computer system 140. The supply chain analysis engine 200 may process the inputs and output product price or product availability. In some cases the supply chain analysis engine may generate or identify additional supply chain analysis to identify weak points in the supply chain. The outputs of the engine 200 may be used as inputs to the scenario analysis application 146. The analysis application 146 may provide an interface for that may be utilized by a user to view and interact with the outputs.

BOM and routing analysis module 204 may analyze the BOM and routing of one or more products. The BOM and routing analysis module may determine dependence between products. The BOM and routing analysis module may analyze the parts or items that are necessary for each product as well as the raw materials, and or operations for each product. BOM and routing analysis module 204 may interact with BOM and routing database 124 and one or more of part databases 122 to determine supply chain resources required for each product. The BOM and routing analysis module 204 may receive one or more BOM lists for one or more products. The BOM and routing analysis module may determine parts or processes that may be shared by one or more products and generate a dependency graph for each product or part. The dependency may include the materials, factories, items, labor, and the like used by each product.

Market trend module 210 may be configured to analyze market data 144 that may be received by the analysis engine. The market trend module may monitor market data for materials or resources associated with one or more products. The market trend module may query or receive data from the BOM and routing analysis module 204 to identify relevant resources. The market trend module may monitor the market prices of the identified resources. The market trend module may monitor the prices of resources and may be configured to trigger an alert or further action when the price of the resources reaches a predefined threshold. When a threshold is reached the market trend module 210 may trigger the analysis engine 200 to simulate the effect of the resource price on the products.

In some embodiments, the market trend module may monitor the market prices of resources and determine market trends. The market trend module 210 may determine if the cost of resources is increasing and the rate of increase. The market trend module may monitor the trends and may be configured to trigger an alert or further action when the rate of increase of the cost of one or more relevant resources reaches a predefined threshold. When a threshold is reached, the market trend module 210 may trigger the analysis engine 200 to generate an alert to notify a system administrator. In some cases, the market trend module may generate predictions regarding the market price of resources based on extrapolations of historical data. Based on the rate of change of the cost of a resource over proceeding days, months, or years, the market trend module may extrapolate the cost of the resources for the next month, or even a year.

Factory analysis module 208 may be configured to monitor the status and reported forecasts of factories, warehouses, storage locations, delivery infrastructure, and the like. The factory analysis module may receive data related to the condition of the factories, costs associated with the factories, throughput, backlog, demand, and the like. The factory status may be monitored to identify changes. When changes are detected the module 208 may be configured to trigger an alert of further action. In some embodiments the further action may include signaling the analysis engine 200 to simulate a supply chain scenario that includes the updated factory data.

Disruption analysis module 202 may be configured to monitor data related to possible disruptions to the supply chain. The disruption analysis module 202 may monitor weather data, labor data, infrastructure disruptions, and the like. The disruption analysis module may filter the data and identify disruptions related to factories or other resources related to one or more products. The disruption analysis module 202 may be configured to filter predicted disruptions that may be shorter than one day or a different predefined threshold. After the disruption analysis module identifies possible disruptions that may be relevant to one or more products, the module may be configured to trigger an alert and/or signal the analysis engine 200 to simulate a supply chain scenario that includes the identified disruptions.

Cost analysis module 206 may be configured to assemble and simulate scenarios of the supply chain related to one or more products to identify how the scenarios may affect the cost of a product. The Cost analysis module may be configured to receive triggers from one or more of other modules in the engine 200. The triggers may be accompanied by scenarios for simulation or parameters for a scenario. For example, the Cost analysis module may receive a trigger from the market trend analysis module 210 with an indication that one or more raw materials used in the production of one or more products has exceeded a predetermined threshold value. Based on the indication the Cost analysis module may query other modules for data related to the supply chain to determine what aspects of the supply chain or what products may be affected by the change in the market price. The analysis module may receive data from the BOM and routing analysis module 204, for example. The Cost analysis module may determine, part by part, resource by resource, or overhead by overhead how an increase in a cost of raw material may affect the cost of a product and which products may be affected. The Cost analysis module 206 may initiate a simulation and determine the effects on the cost of products based on disruptions scenarios received from the disruption analysis module 202, factory status scenarios received from the factory analysis module 208, market scenarios received from the market trend analysis module 210, and the like. In some cases the Cost analysis module may be triggered and receive scenarios from an external source or from a user.

In some embodiments the Cost analysis module may monitor the profit and margin associated with products. As the cost of a product changes the profit and margin of a product may also change. Some changes in profits and margins may warrant a price increase of the product. However, the price cannot be arbitrarily changed as a price change may change may affect the demand of the product. The Cost analysis module 206 may compare data related to projected sales/profits and the unsold inventory of the product. Based on the unsold inventory levels, the cost of the product, and expected profit margins the Cost analysis module may send an indication to a user if the retail price of the product should be adjusted. The Cost analysis module 206 may look at the data from demand forecast for future and projected sales. Based on the analysis of demand forecasts, simulated costs, expected profits and margins, Cost analysis module may send an indication to a user if the retail price of the product should be adjusted.

In some embodiments the supply chain of a product may also include data related to the revenue distribution or budgeting associated with the product. In some cases, the profit associated with the sale of a product may be attributed to a specific group, project, or allotted for the purchase of capital equipment, or the like. Changes in a profit and margin may affect overall revenue associated with a product and may affect aspects of the supply chain that rely on the revenue. The Cost analysis module may analyze and monitor the profit and margins and the expected revenue associated with a product. When the profit and margin changes by more than a threshold value the impact of the change in revenue on the supply chain may be evaluated. A notification to a user may be transmitted indicating a change in the revenue that may affect the supply chain dependent on the revenue.

In some cases the whenever a change in a supply chain is detected the Cost analysis module may calculate the profit margins of products associated with the supply chain and determine changes in revenue. For the calculations the Cost analysis module 206 distinguish between products that have been already produced and are in inventory and products that are to be produced. Products that are already in inventory may be affected by different changes in the supply chain than the products that are yet to be manufactured. Profit and margins of products that are inventory may be affected by changed in transportation costs or changes in warehouse costs whole profit and margins of products that are not yet manufactured may be affected by changes in cost of raw materials as well as changes in transportation costs and changes in warehouse costs.

Availability analysis module 212 may be configured to assemble and simulate scenarios of the supply chain to identify how the scenarios may affect the availability of a product. The availability analysis module may be configured to receive triggers from one or more of other modules in the engine 200. The triggers may be accompanied by scenarios for simulation or parameters for a scenario. For example, the availability analysis module may receive a trigger from the factory analysis module 208 with an indication that one or more manufacturing facilities used in the production of a product has zero extra capacity. Manufacturing locations operating at their full capacity may often experience delays even due to minor problems. Based on the indication the availability analysis module may query other modules for data related to the historical duration of disruptions associated with the manufacturing facility and determine a likely duration of delay in the manufacturing. The availability analysis module may determine, part by part, or resource by resource, or overhead by overhead how a delay in one resource such as a machine in a manufacturing facility may affect delay other resources or activities in the supply chain. The availability analysis module 212 may generate one or more supply chain scenarios related to a delay in the supply chain and simulate how the delay may affect the availability of a product.

Figure 3:
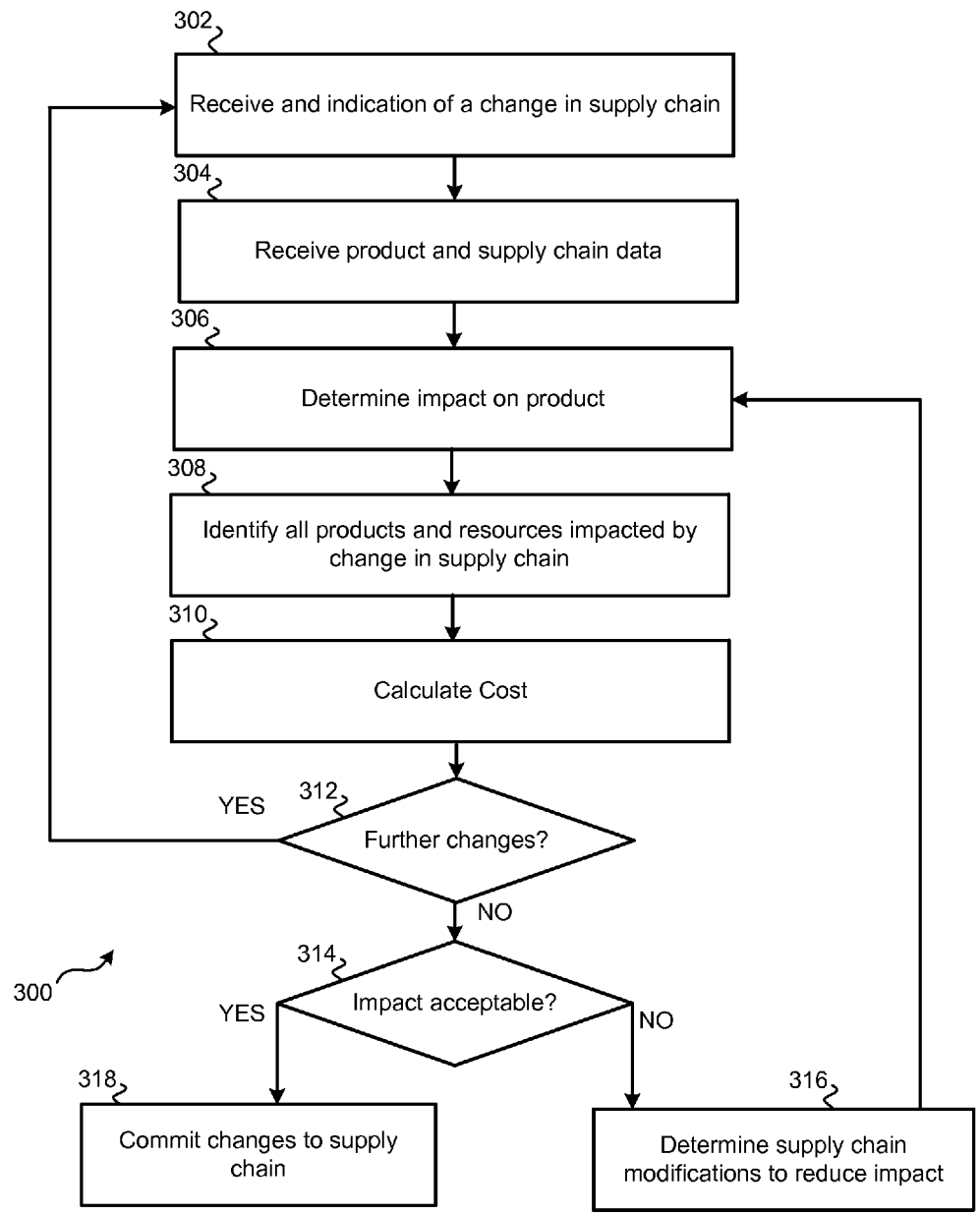
FIG. 3 illustrates an embodiment of a method for performing supply chain analysis.

Various methods may be performed using system 100 of FIG. 1 and the supply chain analysis engine of FIG. 2. FIG. 3 illustrates an embodiment of a method 300 for performing supply chain analysis. Each step of method 300 may be performed using a supply chain analysis engine of FIGS. 1 and 2. As such, each step of method 300 may be performed by a computer system, such as host computer system 120 of FIG. 1. Means for performing method 300 can include one or more computing devices functioning in concert, such as in a distributed computing arrangement.

At step 302, the engine may receive an indication of a change in the supply chain. The indication may be received from a user. In some embodiments the indication may be received from other systems. The indication may relate to a price change of a part in the supply chain. The indication may relate to a delay or unavailability of a resource in the supply chain.

At step 304, the engine may receive product, alternate products, BOM, routing and supply chain data. The data may include steps, resources, parts, costs, schedules, and the like related to the production of one or more products. The data may be analyzed to determine dependencies between resources or parts of the supply chain.

At step 306, the engine may determine the impact of the change in the supply chain on a product or part used in the supply chain. The impact may be calculated or indirectly determined from the change in the supply chain. For example, if the change indicates an increase in the cost of a raw material, the engine may calculate the amount of the raw material used in the product. Based on the amount of the raw material the cost increase of the product may be determined.

At step 308, the engine may determine how the change in the supply chain may affect other supply chains, parts, products, or resources used in other products. A list of impacted resources, supply chains, parts, products may be generated. The list may be generated by analyzing BOM and routing data and performing an explosion on the BOM lists of each product. The engine may further analyze how the changes may affect each final product associated with each supply chain. The engine may determine the expected changes in cost, availability, and the like of the final product. In some cases the system may analyze how the changes in the product availability or the cost of the product may affect incoming orders or viability of the product in the marketplace. In some cases historical sales data may be analyzed to forecast the demand for the product at a new price.

At step 310 system may consider the various supply chain and sourcing routes as indicated by the user and the identified impacted products, intermediate parts, subassemblies, spares, configured item, alternate BOM, alternate routing and the like and may calculate a new cost for each.

At step 312 the completeness of the simulation may be evaluated. The engine may transmit to a user the data related to the impact. The user may evaluate the impact and determine if further changes need to be included into the simulation. The engine may receive an indication from the user and determine whether new changes will require doing redetermination of change impact or just new cost calculation. If the simulation is determined to be complete, then go to step 314.

At step 314 the magnitude of the impact may be evaluated. The engine may transmit to a user the data related to the impact. The user may evaluate the impact and determine if the impact is acceptable. The engine may receive an indication from the user. In some embodiments the engine may automatically determine if the impact is acceptable. The engine may be configured to determine the change in cost or availability of the affected product and if the change is less than 10% or 5%, the engine may automatically determine that the impact is acceptable. If the change is 10% or more the engine may trigger an alert to a user or take further action. In some embodiments, the impact may be determined acceptable if the demand to the product is forecast to change by less than 10%.

At step 316, if the impact is determined to be unacceptable, the supply chain may be modified to reduce the impact. Supply chain modifications for the reduction of impact may be generated by a user. A user may propose supply chain scenarios. The scenarios may be received by the engine and the scenario evaluated as to the impact of the initial change of the supply chain on the scenario. For example, if the initial supply chain indicates a rise in the cost of a raw material from one supplier, a supply chain scenario may be proposed utilizing multiple suppliers. Additional scenarios may be proposed that substitute one or more parts that use the raw material with parts that do not contain the raw material. The proposed scenarios may be evaluated as in steps 306 and 308 to determine if the scenarios reduce the impact on the product. The cycle of identifying new supply chain scenarios and simulating the scenarios to determine the impact on the product may be repeated until the impact to the product is determined to be acceptable.

In some embodiments, the analysis engine may be configured to automatically identify supply chain scenarios that may reduce the impact of a supply chain change on a product. The analysis engine may, for example, identify products and supply chains that are affected by the change in the supply chain. The analysis engine may identify a product that is least affected by the change in the supply chain. The analysis engine may compare the supply chain of the product least affected to the other affected products and identify differences in the supply chains. The differences may be evaluated to determine if the differences may account for differences in the impact to the products. If the differences in the supply chains may be the cause of the differences in the product impact the engine may generate proposed supply chain scenarios that incorporate the differences into the impacted products. The proposed scenarios may be again evaluated as in steps 306 and 308 to determine if the scenarios reduce the impact on the product.

At step 318, if the impact is determined to be acceptable, the supply chain change may be committed. Committing the supply chain change may include updating the local databases related to the BOM and routing of related products. In some cases the supply chain change may be scheduled to be committed on a future date or time when the change is known to have been activated in the supply chain. In some cases system 110 of FIG. 1 and the supply chain analysis engine of FIG. 2 may be used to determine the best date and time to apply the changes to the supply chain.

Figure 4:
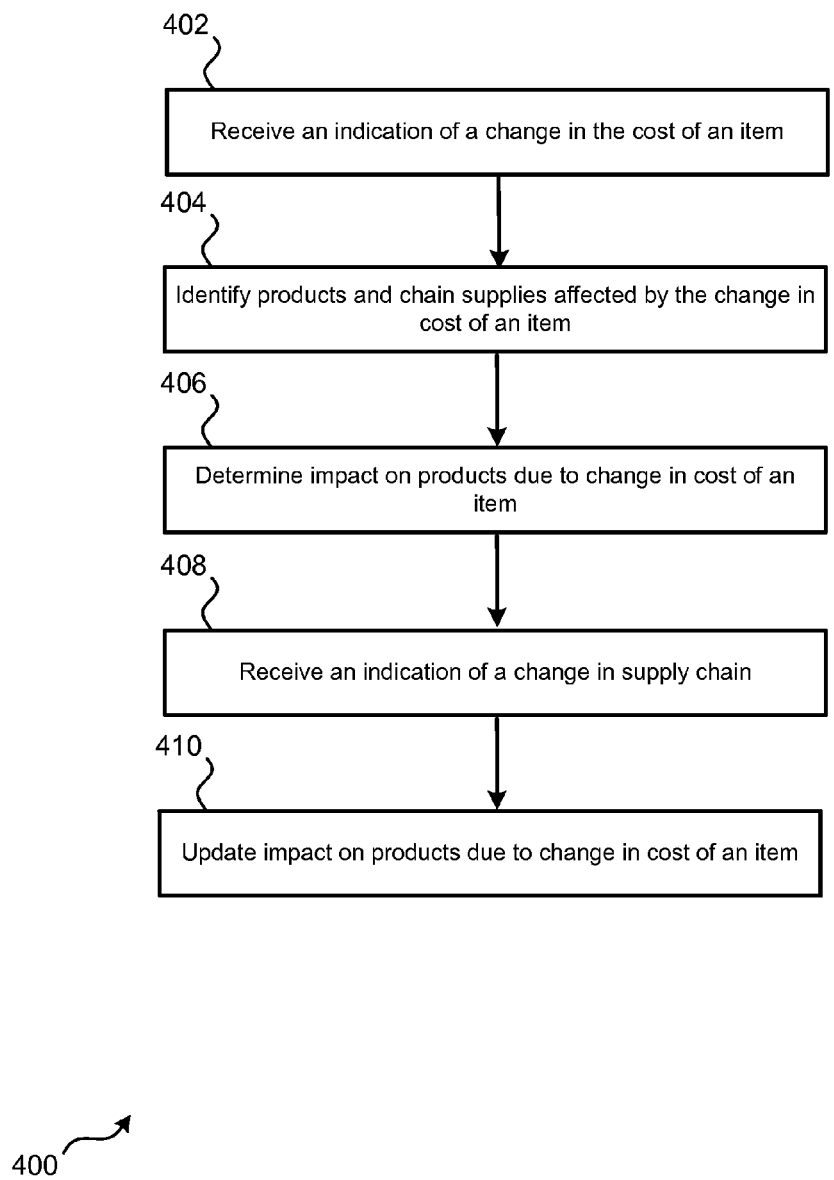
FIG. 4 illustrates another embodiment of a method for performing a supply chain analysis.

FIG. 4 illustrates another embodiment of a method 400 for performing supply chain analysis. Each step of method 400 may be performed using a supply chain analysis engine of FIGS. 1 and 2. As such, each step of method 400 may be performed by a computer system, such as host computer system 120 of FIG. 1. Means for performing method 400 can include one or more computing devices functioning in concert, such as in a distributed computing arrangement. The method 400 may be configured to allow a user to manipulate a supply chain to identify effects of changes.

At step 402 the engine may receive an indication of a change in the cost of a part or other resource or overhead. The indication may be received from a user. A user may use the scenarios analysis application 146 of FIG. 1 to transmit cost changes. The cost changes may reflect actual cost changes the user has been notified about or they may relate to hypothetical scenarios that user would like to evaluate.

At step 404 the engine may determine which products, supply chains, and parts may be affected by the cost change. The engine may search the BOM and routing of each product and supply to identify which products or supply chain use the part. The engine may further analyze the dependency of various supply chains and parts. In some cases some supply chains or products may be affected by a change in cost of a part even though they do not directly utilize the part. A list of related products and supply chains may be generated by the engine and transmitted to a user system.

At step 406 the engine may determine the impact of a cost change on the related products. The engine may receive an indication from a user as to which products or supply chains should be evaluated. A report of the impact may include how the increase in cost may have affected other parts of the supply chain and how these effects resulted in the overall cost change on the final product.

At step 408, an indication of a change in the supply chain may be received. The indication may be received from a user. The indication may be a supply chain scenario generated by the user. The user may modify one or more aspects of the supply chain. At step 410, the engine may determine how the user specified scenarios may affect the impact of the initial cost change of a part on products.

Figure 5:
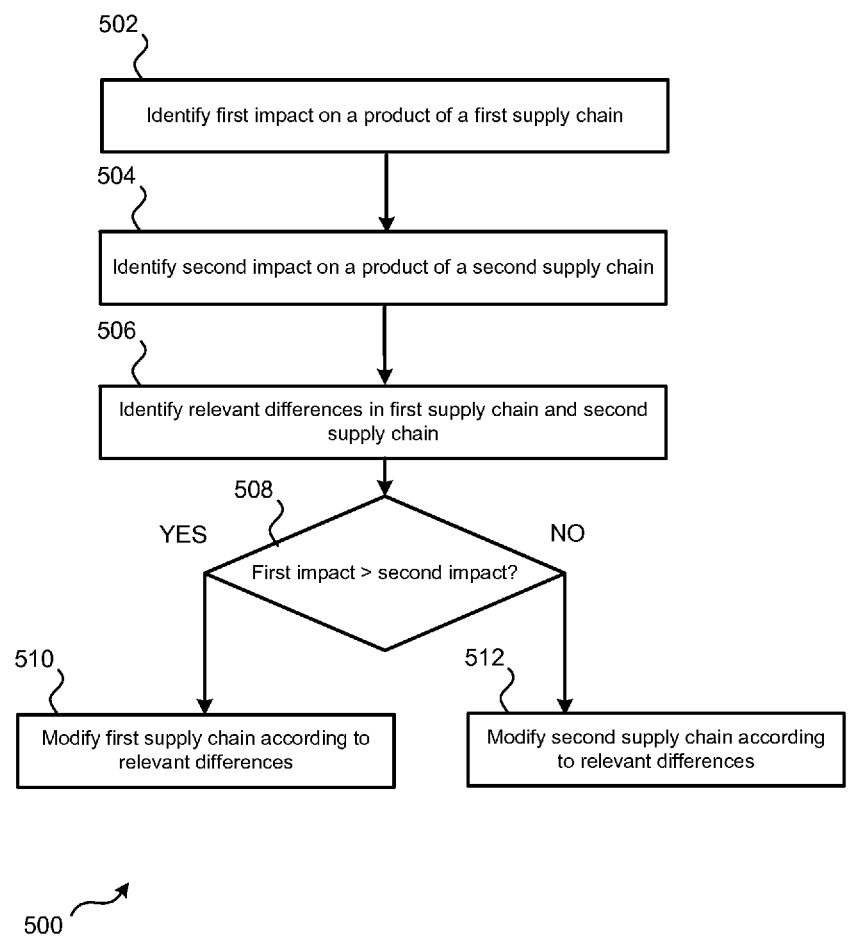
FIG. 5 illustrates an embodiment of a method for identifying supply chain scenarios for reducing the impact of changes.

FIG. 5 illustrates an embodiment of a method 500 for identifying supply chain scenarios for reducing the impact of changes in a supply chain. Each step of method 500 may be performed using a supply chain analysis engine of FIGS. 1 and 2. As such, each step of method 500 may be performed by a computer system, such as host computer system 120 of FIG. 1. Means for performing method 500 can include one or more computing devices functioning in concert, such as in a distributed computing arrangement.

At step 502, after a possible change to the supply chain is identified or indicated to the analysis engine, the engine may determine the impact of the change on a product associated with the first supply chain. At step 504, the analysis engine may also determine the impact of the change on a product associated with a second supply chain. The first and second supply chains may overlap or may be independent of one another. At step 506 the analysis engine may determine relevant differences between the two supply chains. In some cases the first and the second supply chains both include resources, overheads, steps, parts, actions, and the like that may be interchangeable or relevant to both of the supply chains. Although the products generated by both of the supply chains may be different some of the supply chains parts or components may be interchangeable or related. For example, in the manufacture of two products one supply chain may use one shipping company to ship the products from the factory to a distributions center. Another supply chain may use another shipping company to ship the second product from the same factory to a distribution center. In performing a comparison between the first supply chain and a second supply chain, the difference between the shipping companies may be identified as a relevant difference since either shipping company may be used in either supply chain.

At step 508, the analysis engine may determine which product had the lowest impact due to the change. The lowest impact may indicate that the supply chain is more resistant to be impacted by the possible supply chain change. If the second product had a lower impact due to the possible change to the first supply chain, aspects of the second supply chain may be adapted to the first supply chain at step 510. Supply chain aspects from the second supply chain that are relevant to the first supply chain may be substituted into the first supply chain. The supply chain may be simulated to determine if the substitution in the supply chain reduced the impact of the change. At step 512, if the first product had a lower impact, aspects of the first supply chain may be substituted into the second supply chain.

Figure 6:
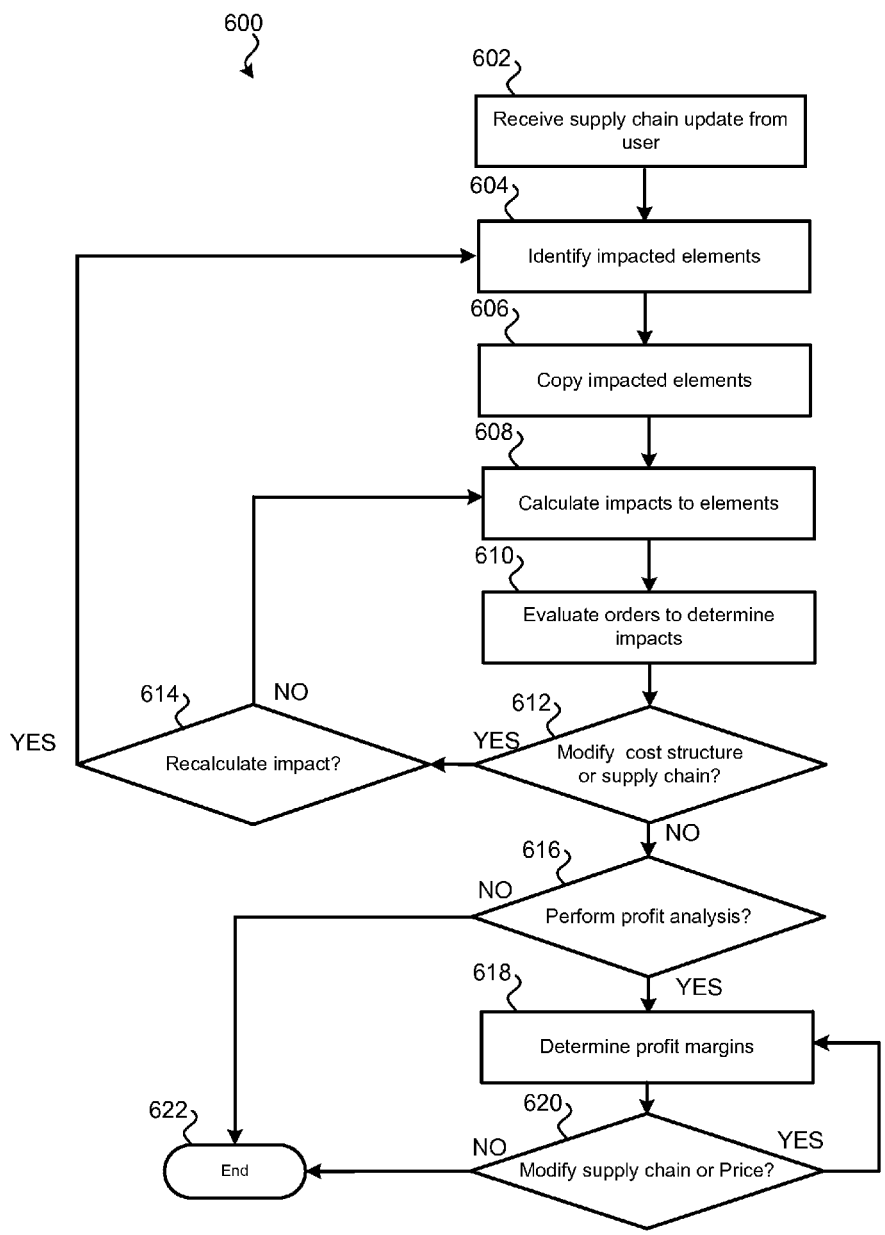
FIG. 6 illustrates an embodiment of a method for performing cost impact analysis.

FIG. 6 illustrates an embodiment of a method 600 for performing cost impact analysis. Each step of method 600 may be performed using a supply chain analysis engine of FIGS. 1 and 2. As such, each step of method 600 may be performed by a computer system, such as host computer system 120 of FIG. 1. Means for performing method 600 can include one or more computing devices functioning in concert, such as in a distributed computing arrangement. Method 600 uses a list of items, resources, overheads, and their new costs supplied by a user to automatically identify impacted assemblies and subassemblies that use these input entities. The method 600 prepares the cost data for simulation, calculates the simulated costs, and, if needed, also calculates the simulated Cost of Goods Sold (COGS), profits and margins.

At step 602 a supply chain update from a user may be received. The supply chain update may include a list of changes to elements such as items, resources, overheads, and the like. Changes may include changes in price, cost, or availability. In some cases the updates may be automatically received from other systems. Updates on costs and price may be automatically received from respective engines, tracking systems, and the like. In some cases a user may interact with an interface, select specific elements of a supply chain and adjust the price, cost or availability of the element. The changes may reflect actual observed changes in the marketplace or supply chain. In some cases the changes may reflect hypothetical changes allowing the user to create "what-if" scenarios to determine the effects of some changes to the supply chain before they occur.

For example, in embodiments, supply chain data may be stored in tables such as the table in depicted in FIG. 8A. The table may be used to store the current cost of components, resources, and overheads. A user may provide a table with updated values of items in the supply chain. FIG. 8C depicts an example list of items that may be supplied by a user with updated costs. The updates may include one or more of the items in FIG. 8A.

At step 604 the method may identify assemblies and sub-assemblies that may be affected by the updates from the user. The method may identify entities such as resources, items, overheads, and the like used in each assembly and determine if any have been updated by a user. In some cases updated items may not be directly used in each assembly or subassembly but may never the less affect the assembly indirectly. One or more levels of the supply chain may be analyzed to determine indirect effects.

Figure 7A:
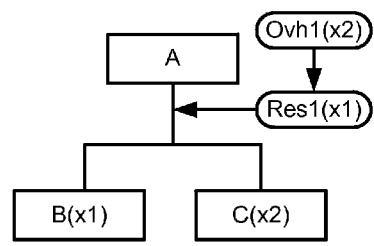
FIG. 7A-7F illustrate example supply chain relationships for items.
Figure 7B:
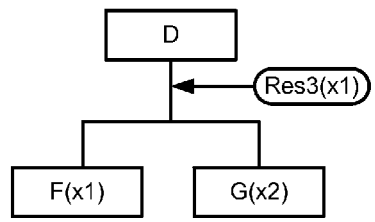
Figure 7C:
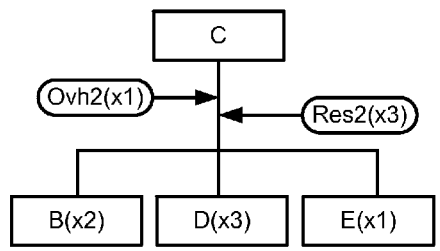
Figure 7D:
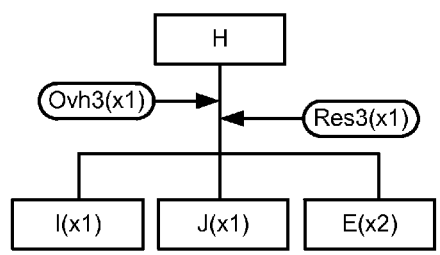
Figure 7E:
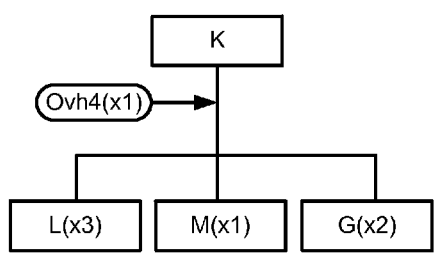
Figure 7F:
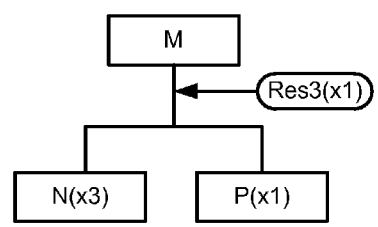

FIGS. 7A-7F depict several example supply chain relationships between items, routing, and bill of materials. Items or assemblies such as A,D,C,H, K, M comprise of other items, assemblies, resources, and routing constraints. For example, as shown in FIG. 7A, 1 unit of item B, 2 units of item C, one unit of resource Res1, and 2 units of overhead Ovh1 are used during the manufacturing process of assembly A. As shown in FIG. 7C, item C is a subassembly made of items B, D, and E, with resource Res2 and overhead Ovh2 being used. Item B is a leaf level item (or component) that is not made of any other items. At step 604 of the method 600, the supply chain of each item may be analyzed to identify items that may be affected by a change. For example, a change in the cost of item D may also affect the cost of item C.

At step 604 the dependencies of elements may be analyzed to determine which assemblies may be affected by the changes identified in step 604. For each updated element of the table in FIG. 8C, for example, the step may use supply chain relationships of FIG. 7A-7F to identify all the assemblies and subassemblies where the items are used and generate a table such as depicted in FIG. 8D.

Returning now to FIG. 6, at step 606 the cost details of all the impacted assemblies and subassemblies may be copied or duplicated. The cost details may include any data structures, dependencies, assumptions, and the like associated with each assembly and subassembly.

At step 608 simulated costs may be calculated. The updates to the supply chain may be used to calculate the magnitude of changes in prices, costs, or availability of element. In some cases each assembly or subassembly may include more than one item that may be affected by the supply chain update. The impact of the updates of each item may be summed to determine the total simulated impact. To calculate the impact, the current costs of the assembly and subassembly items may be calculated by using the current costs of the components, resources, overheads, and subassemblies they use. The calculation procedure may first derive the costs of more leaf level subassemblies before it can proceed to calculate the costs of the higher-level assemblies/subassemblies that are made of the more leaf level subassemblies. Such a calculation procedure may be referred to as the cost rollup procedure. The table in FIG. 8B depicts a rollup of current costs. For instance, as shown in FIG. 7B, 1 unit of component F, 2 units of component G, and 1 unit of resource Res3 are used to manufacture subassembly D. Therefore, the current unit cost of subassembly D is $1*(\text{cost of F})+2*(\text{cost of G})+1*(\text{cost of Res3})=1*6+2*2+1*2=12$. Once the current unit cost of subassembly D is obtained, the current unit cost of subassembly C (made of D) can then be calculated in a similar way. After the current costs are calculated, the costs based on the updated value specified by the user may be used to calculated updated values as depicted in the table in FIG. 8E. The user can then perform in-depth analyses on these simulation results. For instance, the user can view the cost details of the simulated costs and analyze the most granular changes in the cost structure, in order to identify the components, resource, and/or overheads that have the most significant impacts.

At step 610 existing order for element that may be affected by the inventory updated may be identified. On hand inventory, open orders, purchase order, planned orders, in-transit, supplier pipeline and the like may be identified. The simulated impact may be used to calculate the impact to the inventory.

At step 612 further changes could be made to the detailed cost structure, BOM, routing operations, adhoc resources, resource usages, yield rate or the supply chain. If further changes are made then at step 614 is decision is made whether new changes require repeat of steps to identify assemblies and sub-assemblies that may be affected. If repeat is required then step 604 is taken if not required then step 608 is taken. The changes in the BOMs and routings do not modify the actual BOMs and routings of the impacted assemblies/subassemblies in the system. Instead only the revision information (copy created during simulation) is used and tracked. The analysis engine will take the user entered BOM and routing changes and create corresponding alternate BOMs and alternate routings and use those to perform the cost rollup and re-calculate the simulated costs of the impacted assemblies and subassemblies. Once this is done, the user can perform additional analyses on these new simulation results.

At step 616 a decision whether or not to perform profit analysis may be made. If profit analysis is not made, the method may terminate at step 622.

If at step 616 the decision to perform profit analysis is made, the profit and margins may be determined at step 618. During profit analysis, all the shipped, unshipped, and forecasted sales order and revenue information for the impacted assemblies/subassemblies may be gathered and analyzed to determine the impact. When the profit analysis is performed, it first retrieves data list similar to the first seven columns of table shown in FIG. 8F, which already has the quantity, Invoiced Amount, COGS Amount information. For each entry, the Simulated COGS Amount may be calculated through multiplying the simulated unit cost by quantity. The Simulated Margin may also be calculated by subtracting the Simulated COGS Amount from the Invoiced Amount, and the Margin by subtracting the COGS Amount from the Invoiced Amount.

After the simulated COGS and margin results are obtained, comprehensive profitability analyses can be carried out. For instance, the user can compare the actual margin and simulated margin for each impacted product, and identify the top products that have the largest difference between the simulated and actual margins.

At step 620 another decision to modify the supply chain parameters or the product price on sales orders may be made. The changes to the supply chain parameters may be made in view of the calculated profit margins from step 618. If changes to supply chain are made the method may loop back to step 618 to perform the profit and margin calculations with the modified parameters. The method 600 may loop or iterate multiple times until a desired profit margin is achieved. If, in steps 616 and 620 no changes to the supply chain parameters are made the method may terminate at step 622.

Figure 9:
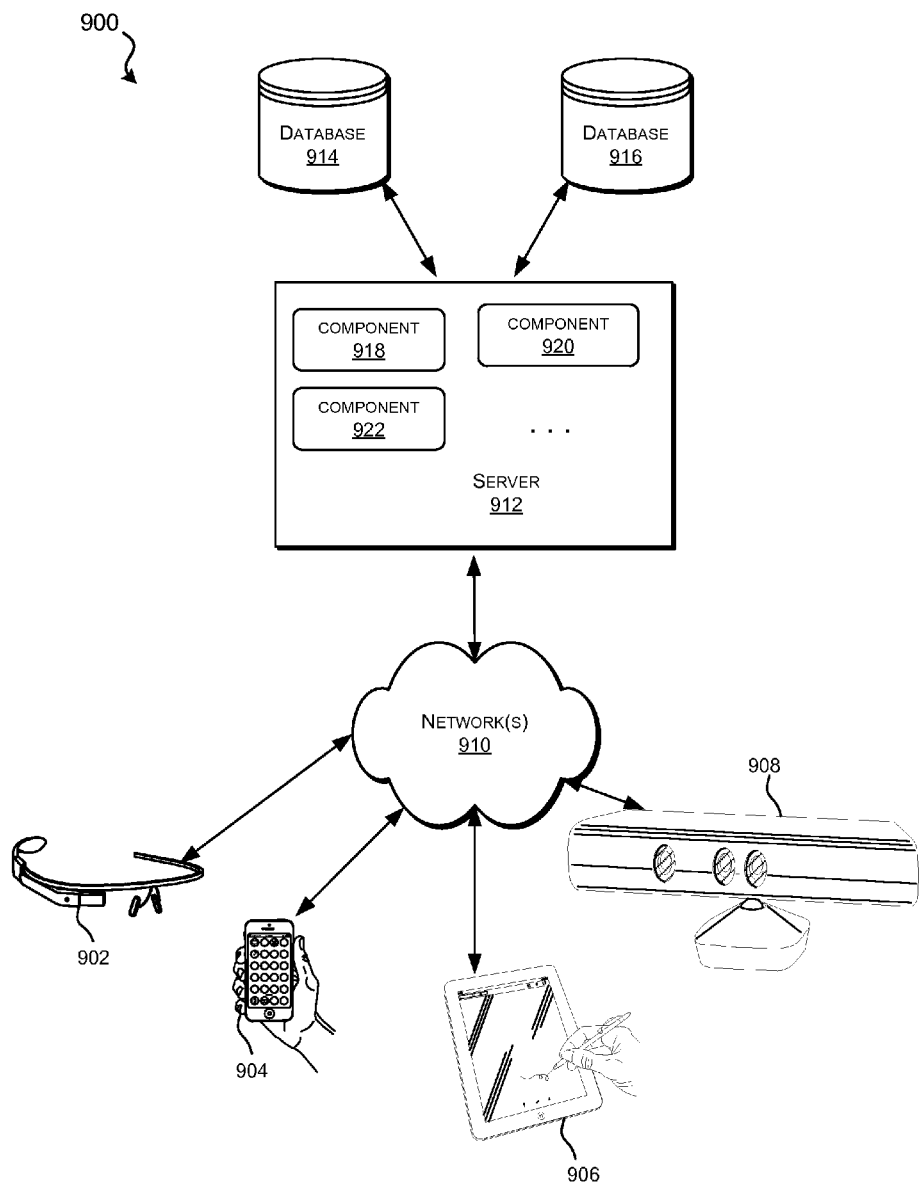
FIG. 9 illustrates an embodiment of a distributed system that permits a user computer system to interact with a supply chain analysis engine.
Figure 10:
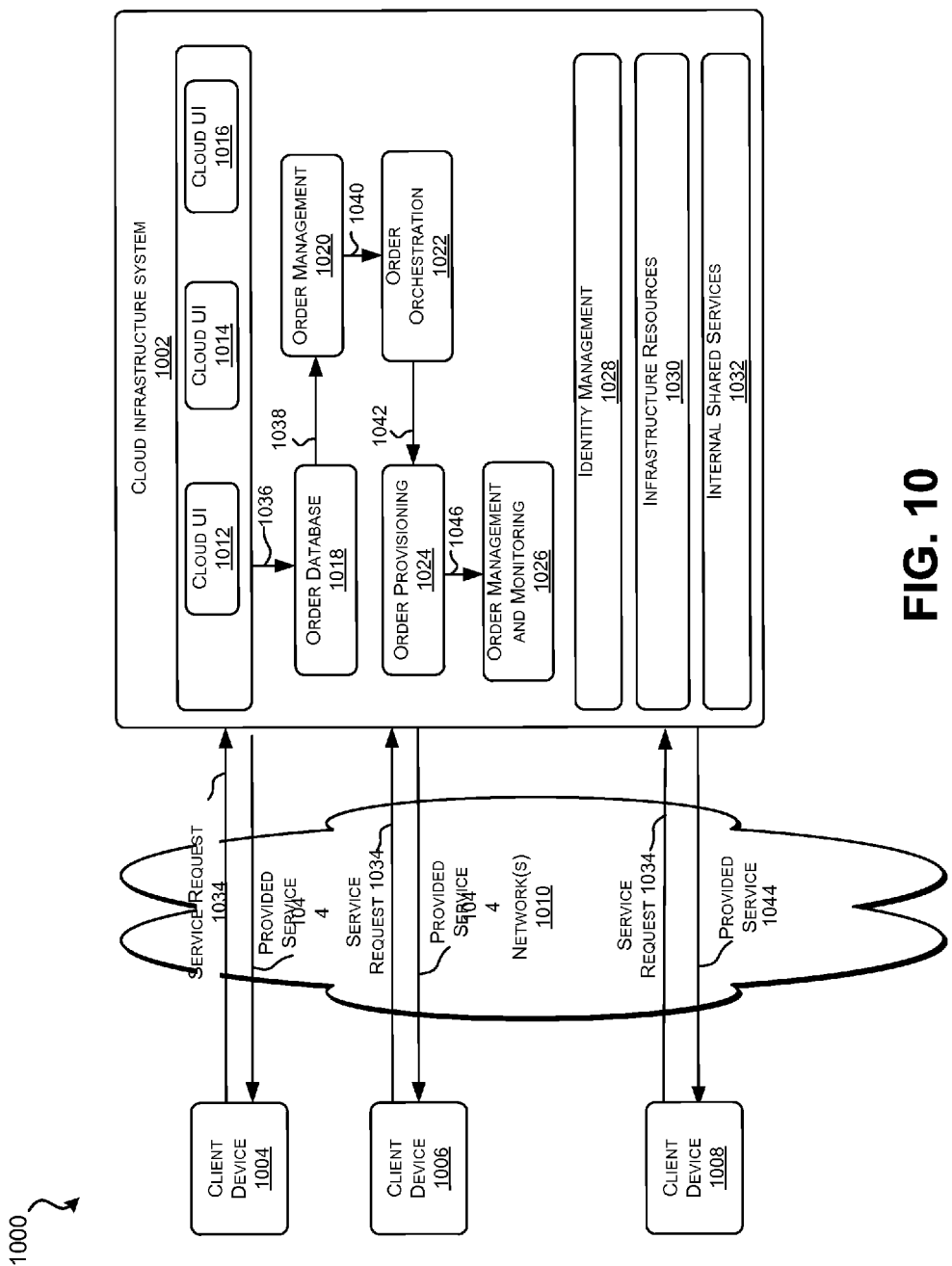
FIG. 10 illustrates a block diagram of an embodiment of a system environment by which services may be offered as cloud services.
Figure 11:
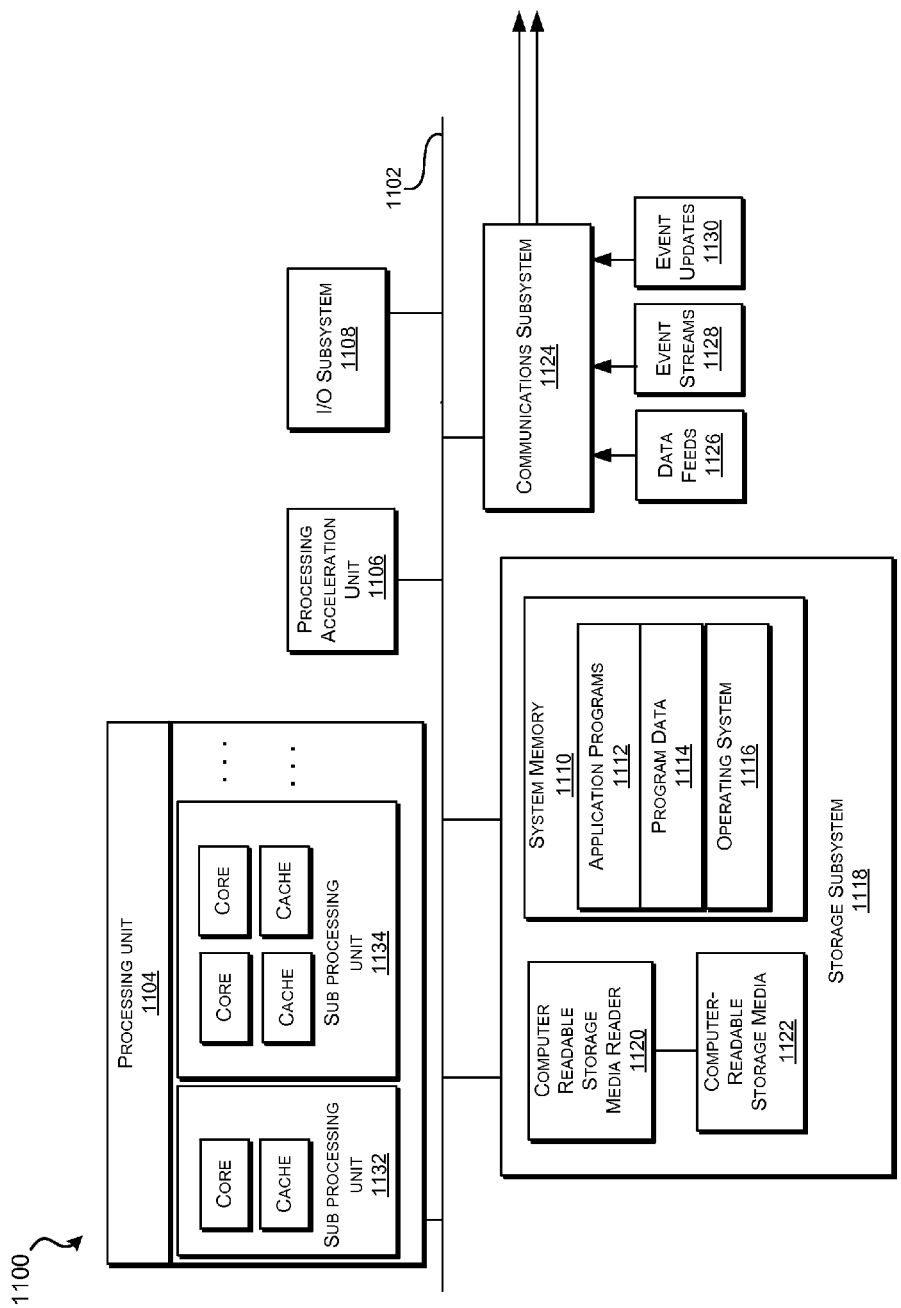
FIG. 11 illustrates an embodiment of a computer system, which may be used to implement various embodiments detailed herein.

FIGS. 9-11 provide additional details on how a distributed system may be implemented that allows user and developers to remotely interact with a web service computer system. FIG. 9 illustrates an embodiment of a distributed system 900 that permits a user computer system to interact with a supply chain analysis engine. In the illustrated embodiment, distributed system 900 includes one or more client computing devices 902, 904, 906, and 908 (which may represent user computer systems), which are configured to execute and operate a client application such as a web browser, proprietary client (e.g., Oracle® Forms), or the like over one or more network(s) 910. Server 912 (which may be the host computer system) may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users/developers operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS®, Windows® Phone, Android®, BlackBerry® 10, Palm® OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle®, that are adapted to store, update, and retrieve data in response to SQL-formatted commands.

FIG. 10 illustrates a block diagram of an embodiment of a system environment by which services may be offered as cloud services. In the illustrated embodiment, system environment 1000 includes one or more client computing devices 1004, 1006, and 1008 (which can include user computer systems) that may be used by users to interact with a cloud infrastructure system 1002 (e.g., the host computer system) that provides cloud services. The client computing devices may be configured to operate a client application such as a web browser, a proprietary client application (e.g., Oracle® Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908. Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 910.

Cloud infrastructure system 1002 may comprise one or more computers and/or servers that may include those described above for server 912. In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like (in addition to the compilation, execution, and debugging functionality previously described). Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle® Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle®) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle® Java Cloud Service (JCS), Oracle® Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. For example, such an arrangement may be used by a customer/developer in order to have the web service computer system perform compilation and execution of the developer's code to be injected. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to. After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements. At operation 1038, the order information is forwarded to an order management module 1020. In some instances, order management module 1020 may be configured to perform billing and accounting functions related to the order, such as verifying the order, and upon verification, booking the order. At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002. At operation 1046, the customer's subscription order may be managed and tracked by an order management and monitoring module 1026. In some instances, order management and monitoring module 1026 may be configured to collect usage statistics for the services in the subscription order, such as the amount of storage used, the amount of data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.). Identity management module 1028 may also include the management of descriptive information about each customer and about how and by whom that descriptive information can be accessed and modified.

FIG. 11 illustrates an embodiment of a computer system 1100, which may be used to implement various embodiments detailed herein, such as the web service computer system, developer computer systems, and user computer systems. It should be understood that the previously described computer systems may include one or more instances of a computer such as computer system 1100. For instance, a group of servers may perform the functions of a web service computer system. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 8111 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present invention.

Storage subsystem 1118 may also include a computer-readable storage media reader 1120 that can be further connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 1100.

By way of example, computer-readable storage media 1122 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1002.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for supply chain analysis, the method comprising:
    receiving, by a computer system, data for a first supply chain currently implemented for manufacturing a first product;
    receiving, by the computer system, an indication of a predicted change to the first supply chain, wherein the predicted change is determined by monitoring one or more aspects of the first supply chain over time as the first supply chain is implemented for manufacturing the first product, and predicting a value of the one or more aspects in the future;
    determining, by the computer system, a first impact to the first supply chain based on the predicted change, wherein the first impact quantifies an influence of the predicted change on the first supply chain based at least on the value;
    determining, by the computer system, that the first impact is greater than a threshold;
    determining, by the computer system and based on the first impact being greater than the threshold, an impact to a second supply chain based on the predicted change, wherein the impact quantifies an influence of the predicted change on the second supply chain based at least on the value, and wherein the second supply chain is currently implemented for manufacturing a second product;
    determining, by the computer system, the influence of the predicted change on the second supply chain is less than the influence of the predicted change on the first supply chain;
    identifying, by the computer system, one or more aspects of the second supply chain relevant to the first supply chain;
    generating, by the computer system, a modification to the data for the first supply chain based on the one or more aspects of the second supply chain relevant to the first supply chain, the modification substituting one or more of the one or more aspects of the second supply chain relevant to the first supply chain for one or more aspects of the first supply chain;
    generating, by the computer system, a first supply chain simulation that injects the modification into the data for the first supply chain to create a modified first supply chain in an attempt to compensate for the influence of the predicted change on the first supply chain;
    determining, by the computer system, a second impact to the first modified supply chain based on the modification injected into the data, wherein the second impact quantifies an influence of the modification on the first supply chain;
    determining, by the computer system, that the second impact is less than the threshold; and
    applying, by the computer system and based on the second impact being less than the threshold, the modification to the first supply chain such that the first product is manufactured using the modified first supply chain.

2. The method for supply chain analysis of claim 1, wherein the first impact and the second impact represent a cost of the first product.

3. The method for supply chain analysis of claim 1, wherein the first impact and the second impact represent an availability of the first product.

4. The method for supply chain analysis of claim 1, wherein the first impact and the second impact represent profitability of the first product.

5. The method of claim 1, wherein the first supply chain is independent from the second supply chain.

6. The method of claim 5, wherein the identifying the one or more aspects of the second supply chain relevant to the first supply chain includes comparing aspects of the first supply chain to aspects of the second supply chain, determining relevant differences between the aspects of the first supply chain and the aspects of the second supply chain, and identifying the one or more aspects of the second supply chain that are relevant to the first supply chain.

7. A computer program product residing on a non-transitory processor-readable medium and comprising processor readable instructions configured to cause one or more processors to:

receive data for a first supply chain currently implemented for manufacturing a first product;

receive an indication of a predicted change to the first supply chain, wherein the predicted change is determined by monitoring one or more aspects of the first supply chain over time as the first supply chain is implemented for manufacturing the first product and predicting a value of the one or more aspects in the future;

determine a first impact to the first supply chain based on the predicted change, wherein the first impact quantifies an influence of the predicted change on the first supply chain based at least on the value;

determine that the first impact is greater than a threshold;

determine, based on the first impact being greater than the threshold, an impact to a second supply chain based on the predicted change, wherein the impact quantifies an influence of the predicted change on the second supply chain based at least on the value, and wherein the second supply chain is currently implemented for manufacturing a second product;

determine the influence of the predicted change on the second supply chain is less than the influence of the predicted change on the first supply chain;

identify one or more aspects of the second supply chain relevant to the first supply chain;

generate a modification to the data for the first supply chain based on the one or more aspects of the second supply chain relevant to the first supply chain, the modification substituting one or more of the one or more aspects of the second supply chain relevant to the first supply chain for one or more aspects of the first supply chain;

generate a first supply chain simulation that injects the modification into the data for the first supply chain to create a modified first supply chain in an attempt to compensate for the influence of the predicted change on the first supply chain;

determine a second impact to the modified first supply chain based on the modification injected into the data, wherein the second impact quantifies an influence of the modification on the first supply chain;

determine that the second impact is less than the threshold; and apply, based on the second impact being less than the threshold, the modification to the first supply chain such that the first product is manufactured using the modified first supply chain.

8. The computer program product of claim 7, wherein the first impact and the second impact represent a cost of the first product.

9. The computer program product of claim 7, wherein the first impact and the second impact represent an availability of the first product.

10. The computer program product of claim 7, wherein the first impact and the second impact represent profitability of the first product.

11. A system for supply chain analysis comprising:
one or more processors;
one or more memories communicatively coupled to the one or more processors; and an analysis module executable by the one or more processors and configured to receive data for a first supply chain currently implemented for manufacturing a first product;

a disruption analysis module executable by the one or more processors and configured to:

receive an indication of a predicted change to the first supply chain, wherein then predicted change is determined by monitoring one or more aspects of the first supply chain over time as the first supply chain is implemented for manufacturing the first product, and predicting a value of the one or more aspects in the future;

determine a first impact to the first supply chain based on the predicted change, wherein the first impact quantifies an influence of the predicted change on the first supply chain based at least on the value;

determine that the first impact is greater than a threshold;

determine, based on the first impact being greater than the threshold, an impact to a second supply chain based on the predicted change, wherein the impact quantifies an influence of the predicted change on the second supply chain based at least on the value, and wherein the second supply chain is currently implemented for manufacturing a second product;

determine the influence of the predicted change on the second supply chain is less than the influence of the predicted change on the first supply chain;

identify one or more aspects of the second supply chain relevant to the first supply chain;

generate a modification to the data for the first supply chain based on the one or more aspects of the second supply chain relevant to the first supply chain, the modification substituting one or more of the one or more aspects of the second supply chain relevant to the first supply chain for one or more aspects of the first supply chain;

generate a first supply chain simulation that injects the modification into the data for the first supply chain to create a modified first supply chain in an attempt to compensate for the influence of the predicted change on the first supply chain;

determine a second impact to the modified first supply chain based on the modification injected into the data, wherein the second impact quantifies an influence of the modification on the first supply chain;

determine that the second impact is greater than the threshold; and apply, based on the second impact being less than the threshold, the modification to the first supply chain such that the first product is manufactured using the modified first supply chain.

12. The system of claim 11, wherein the first impact and the second impact represent a cost of the first product.

13. The system of claim 11, wherein the first impact and the second impact represent an availability of the first product.

14. The system of claim 11, wherein the first impact and the second impact represent profitability of the first product.

* * * * *

UNITED STATES PATENT AND TRADEMARK OFFICE
CERTIFICATE OF CORRECTION

PATENT NO. : 10,049,374 B2
APPLICATION NO. : 14/335704
DATED : August 14, 2018
INVENTOR(S) : Jha et al.

Page 1 of 1

It is certified that error appears in the above-identified patent and that said Letters Patent is hereby corrected as shown below:

In the Specification

In Column 2, Line 10, delete "FIG." and insert -- FIGS. --, therefor.

In Column 2, Line 12, delete "FIG." and insert -- FIGS. --, therefor.

In Column 8, Line 22, delete "and or" and insert -- and/or --, therefor.

In Column 14, Line 65, delete "FIG." and insert -- FIGS. --, therefor.

Signed and Sealed this
Fourteenth Day of May, 2019

Andrei Iancu
*Director of the United States Patent and Trademark Office*